2,820,698
PROCESS FOR PURIFYING SILICON HALIDE

Ignace J. Krchma, Wilmington, Del., assignor to E. I. du Pont de Nemours and Company, Wilmington, Del., a corporation of Delaware No Drawing. Application June 25, 1954
Serial No. 439,451

5 Claims. (Cl. 23—205)

This invention relates to the production of hyperpure, elementary silicon, and more particularly to improved processes for the preparation of that product by removing minor impurities from silicon halides employed as intermediates in such production. Still more particularly it relates to a novel process for removing minor impurities from silicon chlorides utilized in obtaining the desired silicon product.

As is known, relatively pure silicon can be prepared by the vapor phase reduction of redistilled silicon tetrachloride with pure, commercial grade zinc. The silicon obtained contains traces of undesired metal contaminants and up to as much as .03% of carbon. For the most sensitive electronic uses, silicon of higher purity is required because the presence of even trace amounts of impurities proves detrimental for the most exacting semiconductor requirements in the newer electronics applications such as transistors and the like.

Commercially pure silicon tetrachloride is prepared by chlorinating the purest commercially available electro-furnace silicon. Because electro-furnace silicon is made by the reduction of silica in the presence of carbon or graphite, this source of metal always contains appreciable amounts of carbon and other impurities. As these impurities readily chlorinate along with the silicon, and are difficult or impossible to separate from it by distillation or other known means, the purest commercial silicon tetrachloride usually retains objectionable minor or trace amounts of chloro- or oxychloro- or other complex chloro-compounds of such elements as carbon, boron, iron, copper, tin, aluminum, titanium, chromium, nickel, vanadium, phosphorus, etc., as well as oxychloro-compounds of silicon. Hence, the impurity content of commercial silicon tetrachloride is insufficiently low to enable one to readily obtain from it transistor grade pure elemental silicon.

It is among the objects of this invention to overcome these and other disadvantages in prior silicon preparation and to provide novel and effective methods for obtaining silicon in hyperpure, elementary state. A particular object is to provide an improved process for producing such type of elemental silicon by the vapor phase reduction of pure silicon halide, especially silicon tetrachloride vapor, with a pure, elemental reductant metal vapor, particularly zinc or cadmium. A further object is to provide a novel and effective process for producing hyperpure elemental silicon exhibiting improved electrical semiconductor qualities. A further object is to provide a novel, improved process for the purifying of silicon halides. Other objects and advantages of the invention will be evident from the ensuing description.

These objects are accomplished by this invention which comprises prior to utilizing a silicon halide in a reduction operation to obtain elemental silicon, incorporating therein a minor amount of an aqueous medium such as water, separating the water-complexed contaminant-containing phase which results, charging a stream of the recovered, purified silicon halide in the vapor state and a stream of vaporized high purity elemental reductant metal selected from the group consisting of zinc and cadmium into the reaction zone of a vapor phase reduction reactor which is maintained at a temperature above the boiling point of said elemental reductant and below the melting point of the elemental silicon product under production, removing from said zone by-products and unreacted reactants in the vapor state, and recovering the desired, hyperpure elemental silicon which becomes deposited therein.

More specifically, the invention comprises adding to liquid silicon tetrachloride containing minor amounts of contaminating impurities about .01 to 10 moles of relatively pure water per 100 moles of silicon tetrachloride under treatment, mixing the reactants thoroughly, separating the resulting hydrated, hydrolyzed and otherwise water-complexed contaminated phases by conventional distillation treatment, passing a vaporized stream of the purified silicon tetrachloride obtained and a stream of vaporized elemental zinc of high purity into a vapor phase reduction reactor for immediate mixing and reaction, maintaining a slight stoichiometric excess of silicon tetrachloride and a temperature within the range of about 907° C. to 1100° C. in the reaction zone, removing reaction by-products and unreacted reactants therefrom in the vapor state, discontinuing zinc vapor addition while maintaining the reactor at said temperature condition under an atmosphere of silicon tetrachloride vapor, and recovering the hyperpure elemental silicon which is deposited in said zone.

In one practical adaptation of the invention involving a preferred embodiment thereof, silicon tetrachloride of low impurity content, such as cp. grade or redistilled cp. grade silicon tetrachloride containing minor or trace amounts of the contaminating compounds referred to, is utilized as a starting raw material. This material is subjected to a repurification treatment in accordance with the methods disclosed in a copending, concurrently filed application, Serial No. 439,447, by passing a stream of the vaporized and heated silicon tetrachloride over a pyrolyzing zone, comprising a bed of fused silica rings maintained at a temperature within the range of about 900–1000° C., and condensing the effluent vapor therefrom. A minor amount, preferably about one mole percent, of water is added to this condensed product within an all-silica vessel or equipment, the water being added dropwise with accompanying agitation of the mixture. If desired, the water can be incorporated therein by passing a stream of nitrogen or other inert gas, saturated, or partly saturated, with water vapor, through the silicon tetrachloride. The hydrolyzed, hydrated and otherwise water-complexed contaminating compounds obtained, together with any silica precipitated as a hydrous oxide or gel, are then separated from the silicon tetrachloride. This separation can be effected by conventional sedimentation methods, if desired, some of the impurities being effectively removed from the liquid silicon tetrachloride by adsorption of the silica precipitate. Preferably, however, the separation is effected by recourse to fractional distillation since this also removes pyrosynthesized contaminating compounds formed by passing the silicon tetrachloride vapor over the heated pyrolyzing bed of silica rings. The purified silicon tetrachloride distillate recovered is then vaporized and heated to about 900° C. in all-silica equipment and is then charged into an associated vapor phase reduction reactor which is also fabricated of fused silica and is maintained at about 950° C. At the same time, a stream of vaporized elemental zinc of high purity is passed into said reactor, the streams of reactants being mixed immediately upon their introduction. Said reactants are fed at rates close to substantially stoichiometric equivalency, with a 5% to 10% excess of silicon tetrachloride over zinc being maintained.

The silicon product deposits in the reaction zone in elemental hyperpure state. The unreacted reactants and by-product zinc chloride are removed in vaporous state from the reactor, and the reaction is continued until the reaction zone becomes almost completely filled with elemental silicon. The zinc vapor feed is then discontinued, and after allowing silicon tetrachloride vapor to pass through the reactor for about one hour while the reactor is still at a reaction temperature, further addition of silicon tetrachloride is stopped. Thereafter, the hyperpure, elemental silicon is recovered after cooling said reactor.

To a clearer understanding of the invention, the following specific examples are given. These are merely illustrative and are not to be construed as limiting the scope of my invention.

*Example I*

Commercially pure, distilled silicon tetrachloride containing minor amounts of chloro-, oxychloro-, and complex chloro-compounds of carbon, boron, iron, copper, aluminum, tin, titanium, chromium, nickel, vanadium, and phosphorus impurities was used as a silicon raw material source. A heated stream of this silicon tetrachloride was continuously vaporized in all-welded fused silica equipment and passed into an associated preheating coil and pyrolyzing zone, comprising a bed of fused silica rings in a silica tower maintained at a temperature of about 1000° C., a flow rate of silicon tetrachloride vapor being resorted to which afforded a retention within the pyrolyzing bed of about 2 to 3 seconds. The vapor emerging from this pyrolyzing bed was condensed, and about one mole of water vapor per 100 moles of silicon tetrachloride was added as ice to the condensate and thoroughly mixed therewith by agitation. The resulting mixture was then subjected to distillation in a silica-fractionating column, the distillate consisting of highly purified silicon tetrachloride freed of carbon, boron, copper, titanium, aluminum, and oxy-silicon contaminants. This pure product was then revaporized and reheated to about 900° C. at a rate of about 33 cubic centimeters per minute in all-welded silica equipment, and charged into a vapor phase reduction reactor for immediate admixture and reaction with a heated stream of vaporized elemental zinc of high purity. The reduction reaction zone of the reactor was maintained through external heating at a temperature of about 1000° C. Said reactor comprised a horizontally positioned fused silica cylinder about 8 inches in diameter and about 6 feet long, and was equipped at its exit end with a separate disposal system for gaseous by-products. The two reactants were conducted into the reactor through fused, closely adjacent, parallel silica tubing positioned horizontally therein and passing through the entrance end plate wall of the reactor, whereby immediate mixing of the reactant streams occurs upon their entrance into the reactor. The zinc (about 99.999% purity) vapor feed was fed into the reactor at about 34 grams per minute and was vaporized in an associated boiler of fused silica. While continuously passing the zinc and silicon tetrachloride reactants into the reactor, a 5 to 10 percent by weight excess of silicon tetrachloride was maintained in the reduction reaction zone. The hyperpure silicon product continuously deposited within the reactor, and the reaction by-product zinc chloride and unreacted zinc and unreacted silicon tetrachlorides were removed in the vapor state from its exit end over a period of about 40 hours. During this period the reaction space became almost filled with deposited elemental silicon of extremely high purity. The flow of zinc vapor was discontinued first and flow of silicon tetrachloride discontinued about an hour later. The reactor was then cooled to allow recovery of the silicon product which represented a yield of about 50% based on the silicon tetrachloride fed, not including that fed in stoichiometric excess of the zinc.

*Example II*

Commercially pure silicon tetrachloride raw material of the type used in Example I was vaporized and preheated in all-welded, fused silica equipment and charged into an associated pyrolyzing zone containing fused silica chips in a fused silica tower. The silicon tetrachloride was preheated to about 1000° C. and the pyrolyzing bed of silica chips was also maintained at about that temperature. A flow rate was used which afforded a silicon tetrachloride vapor retention within the pyrolyzing zone of about 5 seconds. The vapor emerging therefrom was condensed and about one mole percent of water vapor (based on silicon tetrachloride) carried by argon gas was passed through the silicon tetrachloride. After allowing the mixture to stand for two days, the water-reacted mixture was subjected to fractionation in all-silica equipment and a silicon tetrachloride distillate in highly purified state, particularly with respect to carbon, boron, titanium, aluminum, and oxy-silicon contaminants was recovered. This was reacted with pure zinc in the manner described in Example I to effect recovery of a pure, transistor grade of silicon.

*Example III*

To 100 gram moles of commercially pure silicon tetrachloride raw material of the type used in Example I, one gram mole water, as crushed ice, was added with agitation. The water-reacted mixture was then fractionated in a silica column, the silicon tetrachloride distillate recovered being in highly purified state and freed of boron, titanium, aluminum, and oxy-silicon contaminants.

A stream of this highly purified silicon tetrachloride was vaporized and heated to about 950° C., and then passed into a vapor phase reduction reactor, such as described in Example I, along with a stream of zinc (about 99.999% purity) vapor. The two vapor streams were immediately and continuously mixed within the reactor which was maintained at about 950° C. by external heating. Using the same rates of flow of reactants as in Example I, the reactor was almost filled with high-purity silicon after about forty hours of continuous operation. The zinc chloride by-product and the unreacted reactants were continuously removed from the reactor in the vapor state. The very high-purity electrical transistor grade elemental silicon recovered from the reactor after cooling was of improved semi-conductor quality compared to products from the same zinc and pure silicon tetrachloride of commerce which had not been subjected to the water purification of this invention.

*Example IV*

One hundred gram moles of highly purified silicon tetrachloride was contaminated with boron trichloride and then distilled. Analysis of the distillate revealed .66% by weight of boron content. On redistillation, the boron concentration was reduced only to .46%. Fifty mole percent, based on the silicon tetrachloride, of ice was added to the redistilled silicon tetrachloride, the mixture being stirred, and then filtered through silica wool. The silicon tetrachloride product recovered was found to contain no boron, as determined by spectroscopic analysis.

Another sample of the same contaminated and once-distilled silicon tetrachloride was diluted, in the ratio of 100:1, with the original uncontaminated silicon tetrachloride, to give a silicon tetrachloride product containing 10 p. p. m. of boron, based on silicon tetrachloride. To this mixture was added five mole percent of water, as ice. Filtering on silica wool was then resorted to from which a silicon tetrachloride product containing no boron, as determined by spectroscopic methods, was obtained. The silica gel obtained on the filter was found to contain quantatively the boron removed from the silicon tetrachloride.

The minor or trace amounts of contaminants, especially boron chloride, boron oxychloro-, and other boron-containing compounds, as well as other compounds such as titanium and aluminum halides, in silica tetrachloride are more rapidly hydrolyzed, hydrated, or otherwise complexed by reaction with water than is silicon tetrachloride. Thus, any of these compounds when present in the silicon tetrachloride raw material, even in very small amounts, are complexed upon the contemplated water addition and thereby become separable from the silicon tetrachloride. While distillation comprises a preferred method of separating the water-complexed contaminating phases, nevertheless some separation is obtained by adsorption on precipitated silica which forms when the amount of water added is in excess of the water-complexing requirements of contaminating compounds present. Because the contaminant, water-complexable impurities are present in the silicon tetrachloride in very small and difficultly determinable amounts, the minimum amounts of water required for my contemplated purification can be very small. Thus, use of amounts greatly in excess of that necessary to effect impurity elimination (except insofar as the adsorption effect of newly precipitated silica is utilized) is unnecessary and in fact wasteful of the silicon tetrachloride being treated. Usually, one relatively minor amount of water within a range of from about .01 to 10 mole percent, based on the silicon tetrachloride, is sufficient. Preferably, an amount ranging from about one mole percent and up to 50 mole percent is used, although, if desired, use of greater amounts can be resorted to. Usually, the water in liquid or vapor form and in relatively pure condition, is added to the liquid silicon halide. If desired, it can be added to the vaporized silicon halides.

The temperature of the silicon halide during the water addition is not critical. The addition is usually conducted under such temperature conditions that the silicon tetrahalide will be maintained in the liquid state, with the addition being effected slowly enough so that the heat of reaction is dissipated in the surrounding area without experiencing much temperature rise. As already noted, the water can be added dropwise as a liquid, or in solid form as ice. Alternatively, it can be added as a vapor, such as steam, or as a mixture of water vapor and inert gas such as argon, helium, or nitrogen, etc.

After effecting water addition and reaction, the silicon halide can be separated from the water-complexed contaminating impurities immediately, particularly if such separation is carried out by recourse to distillation. If the impurities present are such that removal thereof is more effectively accomplished by adsorption on the silica precipitated by excess water addition, time can be allowed for such adsorption to take place. Periods of from about four hours to about four days can be utilized in this type of separation.

The pyrolyzing bed used is maintained at a temperature above 600° C. However, to secure best results, temperatures above that to which the silicon halide is to be subjected in the silicon halide reduction reactor are resorted to. Preferably, and to effect complete conversion of the contaminating compounds to removable species form, bed temperatures within a range of 975° C. to 1200° C. are employed. The silicon tetrachloride entering the pyrolyzing zone is preferably preheated to a temperature close to that at which said pyrolyzing zone is maintained during operation. Said zone comprises an enclosed area of heat transfer surface, such as an unpacked tube of inert, non-contaminating, refractive material such as silica or a pervious bed of packing material of similar material, enclosed in a tube, chamber or tower. Silica is particularly suitable as a tube or packing surface, since it can be obtained in a state of fairly high purity, and readily be fabricated and welded to form a continuous type apparatus. Packing material such as rings, chips, or fragments of 2–16 mesh or larger are suitable. Where silica is used as the pyrolyzing surface for silicon tetrachloride, some decomposition of the silica takes place, particularly at the higher temperature ranges, due to chlorination by the silicon tetrachloride.

The contact time of the silicon halide within the heated pyrolysis zone is dependent upon the types and amounts of contaminants to be removed as well as the temperature at which that zone is maintained. A sufficient period of contact is allowed to enable pyrosynthesizing reactions to take place so that compounds sufficiently changed in molecular weight for easy separation from the silicon tetrachloride will be obtained. Usually, about 1–5 seconds at the temperature indicated will prove adequate, although from about ½ a second to about one minute of contact can be utilized.

The temperature of the reduction reaction zone is maintained above the boiling point of the elemental zinc or cadmium metal reductant and below the melting point of the elemental silicon product or within the range above mentioned. The silicon halide and the zinc reactant vapors entering the reactor are preferably preheated to a temperature close to that being maintained within the reduction reaction zone during operation.

The reduction reaction can be carried out using up to about 50 percent by weight, and preferably from about 5 to 10 percent, excess or deficiency of silicon tetrachloride over, for example, zinc, based on the equation:

$$2Zn + SiCl_4 = 2ZnCl_2 + Si$$

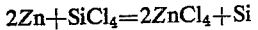

In order to further insure production of a hyperpure product, the flow of silicon tetrachloride is maintained through the reaction zone for a short period of time after the flow of zinc vapor through that zone has been discontinued at the end of the continuous reaction period.

While the process of the invention is particularly applicable to silicon tetrachloride, it is generally applicable to silicon halides. Thus, in addition to silicon tetrachloride, treatment and use of disilicon hexachloride, silicon tetrabromide, silicon tetrafluoride and the like is contemplated hereunder.

If desired, recourse to an inert carrier gas, such as hydrogen, argon, nitrogen, or other gas selected from the eighth group of the periodic table can be had for assisting in the conveyance of the silicon halide or vaporized zinc or cadmium reductant metal through the system, as well as to control the reaction conditions.

The pressure at which the silicon halide is maintained over the silica or other pyrolyzing surface is not considered critical. While pressures very close to atmospheric are satisfactory for use, recourse to higher or lower pressures is contemplated. The pressures of the metal reductant vaporization system and interrelated reduction reactor system are operated close to substantially atmospheric pressure. If desired, they may be operated at higher or lower pressures.

It is evident that the addition of water to silicon halides followed by separation of the complexed contaminating compounds formed thereby, as herein contemplated, affords a readily adaptable method for eliminating undesired contaminants from such halides and provides a high purity form of product. Furthermore, in the instance of silicon tetrachloride treatment, there is obtained a product not only useful for the production of exceptionally high-quality silicon of transistor grade, but which can be employed in other uses wherein high purity silicon tetrachloride is required, e. g., to produce silica and other compounds of silicon in a state of extremely high purity. Again, the purification treatments of this invention can be readily utilized in combination with others in processes for the manufacture of hyperpure silicon to eliminate traces of other contaminating materials from silicon tetrahalide intermediate and final silicon product. When used in conjunction with a high temperature zone treatment for pyrolyzing contaminating compounds, my novel water treatment can be effected either before or after the pyrolyzing process, as desired or preferred.

The silicon chloride resulting from my improved purification process, while eminently suitable for reduction to hyperpure elementary silicon by zinc or cadmium, can be reduced also by other reductants—for example, hydrogen, sodium, and the like, with advantageous results.

I claim as my invention:

1. A process for purifying a silicon halide, containing only trace amounts of contaminating compounds, consisting essentially of adding to said halide from about 0.1 to 50 mols of water per 100 mols of silicon halide to be purified, agitating the resulting mixture and separating therefrom the products resulting from the water addition and recovering a purified silicon halide.

2. A process for purifying a silicon halide, containing only trace amounts of contaminating compounds, consisting essentially of adding to said halide from about 0.1 to 10 mols of water per 100 mols of silicon halide to be purified, agitating the resulting mixture and separating therefrom the products resulting from the water addition and recovering a purified silicon halide.

3. A process for purifying a silicon tetrachloride, containing only trace amounts of contaminating compounds, consisting essentially of adding to said tetrachloride from about 0.1 to 50 mols of water per 100 mols of silicon tetrachloride to be purified, agitating the resulting mixture and separating therefrom the products resulting from the water addition and recovering a purified silicon tetrachloride.

4. A process for purifying a silicon tetrachloride, containing only trace amounts of contaminating compounds, consisting essentially of adding to said tetrachloride from about 0.1 to 10 mols of water per 100 mols of silicon tetrachloride to be purified, agitating the resulting mixture and separating therefrom the products resulting from the water addition and recovering a purified silicon tetrachloride.

5. A process for purifying a silicon tetrachloride, containing only trace amounts of contaminating compounds, consisting essentially of adding to said tetrachloride from about 0.1 to 10 mols of water per 100 mols of silicon tetrachloride to be purified, agitating the resulting mixture and separating the products resulting from the water addition by distilling the silicon tetrachloride and recovering a purified silicon tetrachloride.

References Cited in the file of this patent

UNITED STATES PATENTS

| | | |
|---|---|---|
| 1,241,796 | Weaver | Oct. 2, 1917 |
| 2,306,184 | Pechukas | Dec. 22, 1942 |
| 2,311,466 | Pechukas | Feb. 16, 1943 |
| 2,594,370 | Warburton | Apr. 29, 1952 |

FOREIGN PATENTS

| | | |
|---|---|---|
| 627,904 | Great Britain | Aug. 18, 1949 |
| 656,098 | Great Britain | Aug. 15, 1951 |

OTHER REFERENCES

Mellor: "Comprehensive Treatise on Inorganic and Theoretical Chemistry," vol. 6, page 964. Longmans, Green & Co., N. Y. C., 1925.

Lyon et al.: "J. of Electrochemical Society," vol. 96, No. 6, December 1949, pages 359–363.

B. I. O. S.: Final Report No. 1081, Item No. 22 "Silicon Tetrachloride and Related Products Silicons, Silicic Acid Esters, Finely Divided Silica," pages 13 and 19, O. T. S. release date July 11, 1947.